Figure 1:
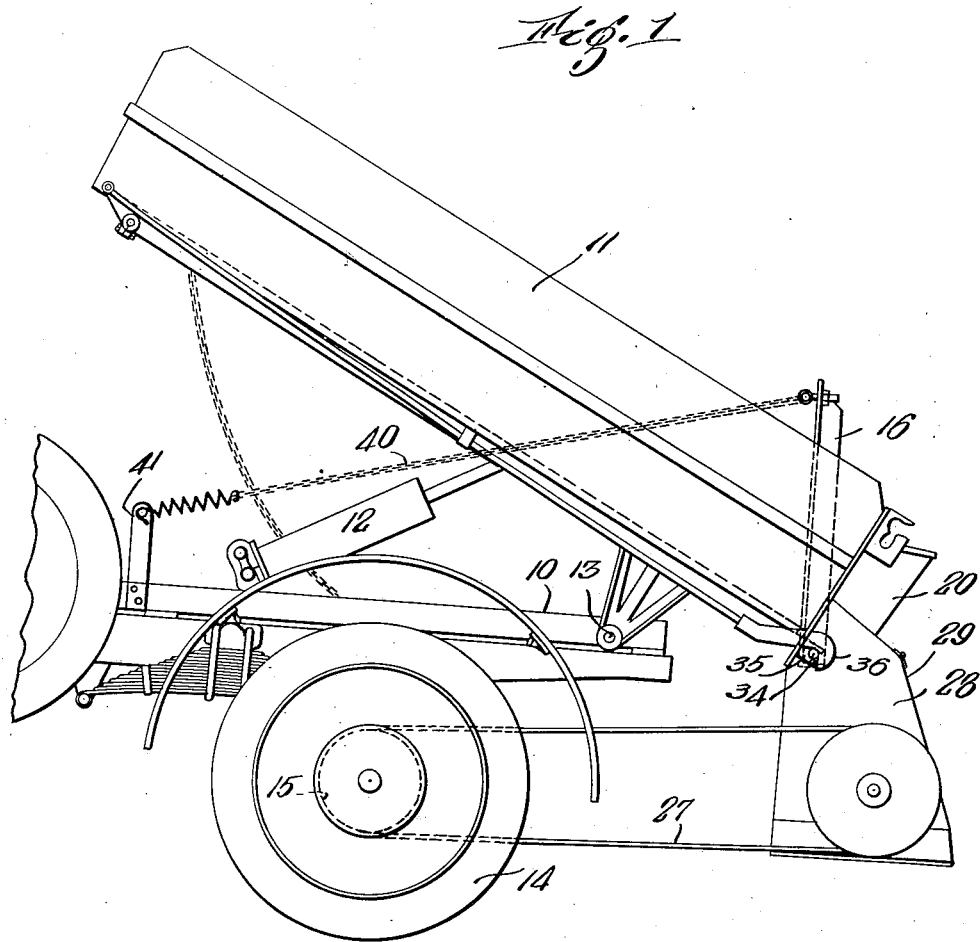

Sept. 26, 1933.

H. W. PUTNAM 1,928,030

SAND SPREADING APPARATUS

Filed July 1, 1932

2 Sheets-Sheet 1

Inventor
Harold W. Putnam
By Auden D. Thomson
his Attorney.

Sept. 26, 1933.    H. W. PUTNAM    1,928,030
SAND SPREADING APPARATUS
Filed July 1, 1932    2 Sheets-Sheet 2
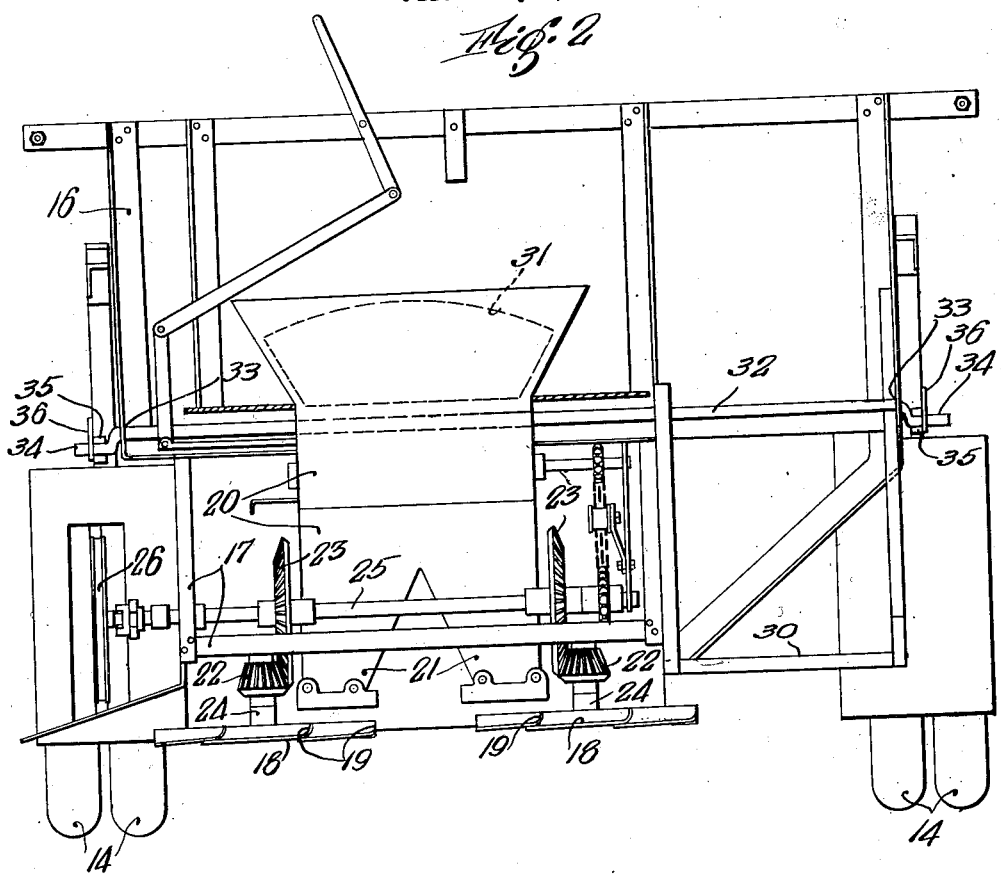
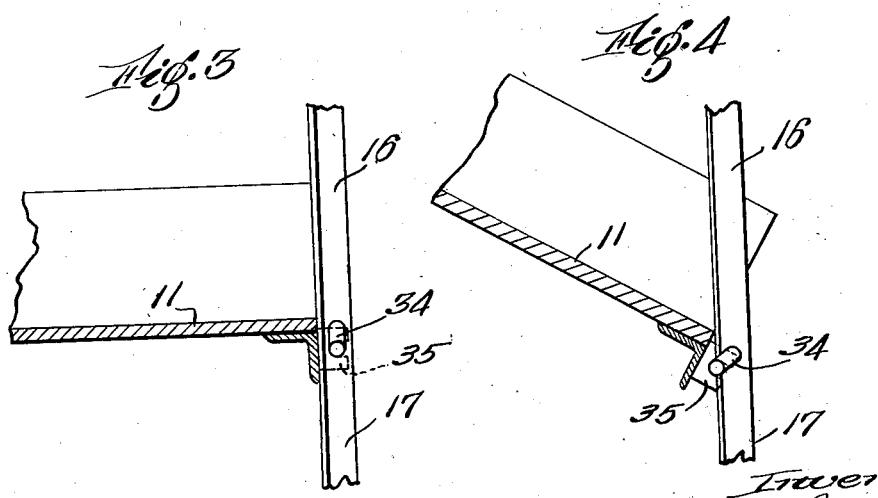
Inventor
Harold W. Putnam
by Auden D. Thomson
his Attorney.

Patented Sept. 26, 1933

1,928,030

UNITED STATES PATENT OFFICE 1,928,030

SAND SPREADING APPARATUS

Harold W. Putnam, Reading, Mass.

Application July 1, 1932. Serial No. 620,419

15 Claims. (Cl. 275—2)

This invention relates to apparatus for spreading sand, gravel, chips, crushed stone or like material, and pertains more particularly to improvements in sand spreaders of the type carried by a truck or other moving vehicle for sanding a road surface. The principal purpose of the invention is to provide a sand spreading unit which is connected to the rear of a tiltable truck body in such a manner that the unit is supported in operative position irrespective of the inclination of the truck body.

Road spreading apparatus of the type to which this invention pertains ordinarily comprises one or more discs, cones or other rotatable elements arranged to rotate about a vertical axis, a conduit or hopper for feeding a stream of sand upon the spreading discs, and means for rotating the discs to scatter the sand over the surface to be covered. For the efficient operation of such apparatus, it is necessary that the rotating spreading elements remain substantially in a horizontal plane at all times, and it is also desirable that the spreading apparatus be operatively associated with the inclined, sand-loaded body of a truck, in order that the sand may be fed continuously and regularly to the rotating spreaders as the vehicle is driven along the road.

The main feature of the apparatus herein disclosed as illustrative of this invention accordingly resides in the means which I have devised for pivotally mounting a portable spreading unit at the rear end of a tiltable truck body and for holding the apparatus in operative position and restraining its movement relative to the chassis of the truck at all inclinations of the body. Further objects of the invention include the provision of means for supporting the unit directly upon the truck or vehicle to which it is removably connected, thereby avoiding the necessity of placing road wheels on the unit itself; the provision of driving means for operating the spreading mechanism, such means being independent of an auxiliary traction wheel and preferably connecting with the hub of the truck wheel; and the particular devices which I preferably employ for connecting the apparatus to the truck.

A recommended embodiment of the invention is shown in the accompanying drawings, in which, Fig. 1 is a side view of a typical dump truck equipped with the improved spreading apparatus, the truck body being inclined to useful position;

Fig. 2 is a rear view of the truck and spreading mechanism, the truck body being lowered and the outer casing of the mechanism being removed; and Figs. 3 and 4 are diagrammatic details showing the arrangement of the pivotal connection as the truck body is tilted from horizontal to inclined position.

It will be understood that the structural details of the spreading apparatus as well as the truck or vehicle are not essential to the present invention and consequently may be varied within wide limits to suit particular purposes without departing from the spirit of the invention as defined in the appended claims. Hence, the views shown in the drawings are more or less diagrammatic in character, all non-essential elements being of common or known construction.

For the purpose of this disclosure the truck chassis represented generally at 10 is provided with a tiltable dump body 11 which is elevated by suitable operative means indicated at 12, the body being hinged to the chassis at 13 and the chassis being mounted upon twin pairs of rear wheels 14 at least one pair of which are located on opposite sides of a hub or drum 15.

The road spreading unit comprises a rigid frame including an upper portion 16 which may constitute the tail gate of the body 11 and a lower part 17 which carries the spreading mechanism; a pair of rotatable spreading elements or discs 18 having the usual radial fins 19 for broadcasting the sand over the road surface; a delivery hopper 20 leading through a suitable opening 31 in the tail gate from the sandloaded body 11, and having a pair of distributing outlets 21 for delivering streams of sand or the like to the spreaders 18; and suitable gearing 22, 23 for rotating the spreader shafts 24 from a common driven shaft 25, the latter having a pulley 26 which is preferably connected by a belt 27 to the drum 15 of the wheel hub. The operative mechanism may be enclosed by a casing 28 having a hinged rear cover 29, and an operator's platform 30 may be provided at one side of the enclosed apparatus.

In accordance with this invention, the apparatus just described may be assembled as a portable unit before it is applied to the truck and may be subsequently removed whenever desired. To this end and for the purpose above set forth, the assembly is pivotally connected to the rear end of the truck body by suitable fastening means preferably comprising a shaft or bar 32 which extends through openings in the frame 16 as indicated at 33 and which has offset ends or crank portions 34 fitting in slots or bearings in rearwardly projecting forks 35 of the body. The shaft ends are suitably locked in said forks by means of latches 36 or other retaining devices which may be released to permit removal of the spreading apparatus. As shown in Figs. 3 and 4, the cranks or offsets 34 allow for transverse shifting of the shaft 32 as the body is raised to inclined position, so that the rear end of the body continuously engages the frame 16, 17.

Hence the spreading assembly or unit may swing relatively to the body, the tail gate 16 being received between the sides of the body as the latter is inclined (Fig. 1), and the angular relation of the unit to the truck chassis or road surface being preserved at all times. The unit is preferably held in such operative position (with its spreader discs approximately horizontal) by supporting means connected to the truck chassis and arranged substantially to prevent relative angular movement between the chassis 10 and the spreading apparatus, irrespective of movement of the body 11. Such means may include a cable connection or link 40 secured to the upper frame portion 16 and to the chassis as by a bracket 41 or other attachment.

As the lower portion of the spreading assembly is held against outward movement by the driving belt 27, the upper cable may be flexible as indicated; but it will be evident that the connecting link 40 need not necessarily be flexible, and that the specific structural details herein described may be modified to suit particular purposes without departing from the spirit of the invention as defined in the appended claims.

From the foregoing it is apparent that the improved spreading assembly or unit for distributing sand, gravel or similar road material may be simply and easily connected to a dump truck by a pivotal mounting which allows the unit to assume its operative position irrespective of the inclination of the truck body; and that such operative position is maintained by means interconnecting the unit and the truck chassis and substantially preventing relative movement therebetween while the truck and spreading apparatus are in operation. The unit is so supported that the relative angular relation between the pivoted unit and the road surface is substantially maintained at all times, and the operation of the spreading mechanism is efficiently performed without the employment of guide or traction wheels upon the unit itself.

I claim:

1. In combination with a vehicle having a tiltable body pivoted thereto, a sand spreading unit adapted to receive sand from the tilted body and distribute it over the road while the vehicle is in motion, means independent of the body pivot for pivotally interconnecting said body and said unit, and means for holding the unit in operative position irrespective of the inclination of the body.

2. In combination with a vehicle having a tiltable body, a sand spreading unit adapted to receive sand from the tilted body and distribute it over the road while the vehicle is in motion, means for pivotally and removably connecting the unit to the rear end of the body, and means associated with the unit and the vehicle for holding the pivoted unit in operative position irrespective of the inclination of the body.

3. In combination with a vehicle having a tiltable body pivoted to its frame, a sand spreading unit having a rotatable spreading element arranged to receive sand from said body and distribute it over the road, means independent of the vehicle frame for pivotally connecting the unit to the body at the rear end thereof, means for holding the pivoted unit in operative position irrespective of the inclination of the body, and means for operating the spreading element while the vehicle is in motion.

4. In combination with a vehicle having a tiltable body, a sand spreading unit adapted to receive sand from the tilted body and distribute it over the road while the vehicle is in motion, means for pivotally and detachably mounting the unit upon said body at the rear end thereof so that the unit is movable angularly with respect to the body and chassis of the vehicle, and means connected to the chassis of the vehicle for holding the unit in operative position irrespective of the inclination of the body.

5. In combination with a vehicle having a tiltable body, a sand spreading unit having movable spreader elements adapted to receive sand from the tilted body and distribute it over the road while the vehicle is in motion, means for pivotally mounting the unit upon the body, means connected to the wheel hub of the vehicle for operating the spreader element and restraining pivotal movement of the unit in one direction, and a link interconnecting the unit and the chassis of the vehicle for restraining pivotal movement of the unit in the opposite direction.

6. In combination with a vehicle having a tiltable body, a sand spreading unit adapted to receive sand from the tilted body and distribute it over the road while the vehicle is in motion, means for pivotally mounting the unit upon the body, and connecting means attached to the chassis of the vehicle and to said unit above its pivotal axis for restraining swinging movement of the unit in one direction relative to the chassis, irrespective of the inclination of the body.

7. In combination with a vehicle having a tiltable body, a sand spreading unit adapted to receive sand from the tilted body and distribute it over the road while the vehicle is in motion, means for pivotally mounting the unit upon the body, connecting means attached to the chassis of the vehicle and to said unit above its pivotal axis for restraining swinging movement of the unit in one direction relative to the chassis, irrespective of the inclination of the body, and a driving connection for operating the spreading unit associated with the wheel hub of the vehicle and with the unit below its pivotal axis whereby to restrain swinging movement of the unit in the opposite direction.

8. In combination with a vehicle having a tiltable body, a sand spreading unit comprising a frame and spreading mechanism carried thereby, a shaft extending through the frame, and adapted to support said unit, means connecting said shaft to the rear end of the body so that the unit may swing relative to the body, and means attached to the frame remote from said shaft and connected to the chassis of the vehicle for holding the unit in operative position irrespective of the inclination of the body.

9. In combination with a vehicle having a tiltable body, a sand spreading unit comprising a frame and spreading mechanism carried thereby, a shaft extending through the frame and adapted to support said unit, the body having forked projections receiving the end portions of said shaft, latch means for releasably locking the shaft therein, thereby pivotally and detachably connecting the spreading unit to said body so that the unit may swing relative to the vehicle, and means for holding the unit in operative position irrespective of the inclination of the body.

10. In combination with a vehicle having a tiltable body, a sand spreading unit comprising a frame and spreading mechanism carried thereby, a shaft extending through the frame and adapted to support said unit, means connecting said shaft to the rear end of the truck body so that the unit may swing relative to the body, the upper end of said frame constituting a tail gate for the body, means at the sides of the truck body for removably attaching said shaft thereto, and means for holding the unit in operative position irrespective of the inclination of the body.

11. In combination with a vehicle having a tiltable body, a sand spreading unit having a frame and spreading elements rotatable in said frame, a shaft passing through said frame and adapted pivotally to support the unit at the rear end of the vehicle body so that the unit may swing relative to the vehicle, means for detachably connecting said shaft to said body, means for holding the unit in operative position irrespective of the inclination of the body, and means for rotating said spreading elements while the vehicle is in motion.

12. In combination with a vehicle having a sand delivery body pivoted to its frame, a road spreading unit adapted to receive sand from the body and distribute it over the road surface, means remote from the body pivot for pivotally connecting the unit to said body, and means associated with the vehicle and independent of the road surface for holding the entire unit in operative position.

13. In combination with a vehicle having a sand delivery body pivoted to its frame, a road spreading unit adapted to receive sand from the body and distribute it over the road surface while the vehicle is in motion, means remote from the body pivot pivotally and detachably connecting the unit to the vehicle so that the unit is movable angularly relative thereto, and means connected to the vehicle for holding the entire unit in operative position during movement of the vehicle, said last named means being independent of the road surface.

14. In combination with a vehicle having a dump body, a road spreading unit adapted to receive sand from the body and distribute it over the road surface while the vehicle is in motion, means independent of the vehicle frame for pivotally connecting the unit to the body so that the unit is movable angularly relative to the vehicle frame and body, and means interconnecting the unit and vehicle for maintaining the relative angular relation between the unit and the road surface irrespective of the inclination of the body.

15. In combination with a vehicle having a tiltable body pivoted thereto, a sand spreading unit having a rotatable element for distributing sand or the like from said body over the road surface, means independent of the body pivot for pivotally and removably connecting the unit to the body so that the unit is movable angularly with respect to the body of the vehicle, means for operating said rotatable element while the vehicle is in motion, and means connected to the chassis of the vehicle and independent of the road surface for restraining pivotal movement of the unit in both directions with respect to the chassis, and for holding the unit in operative position relative to the road surface irrespective of the inclination of the body.

HAROLD W. PUTNAM.